Oct. 30, 1962 D. L. MITCHELL 3,061,822

MAGNETIC DATA STORAGE DEVICE OF THE DRUM TYPE

Filed Dec. 2, 1958 4 Sheets-Sheet 1

Inventor
Darrell L. Mitchell by Sughrue and Rothwell Attys

Oct. 30, 1962 D. L. MITCHELL 3,061,822

MAGNETIC DATA STORAGE DEVICE OF THE DRUM TYPE

Filed Dec. 2, 1958 4 Sheets-Sheet 2

Inventor
Darrell L. Mitchell by Sughrue and Rothwell Attys

MAGNETIC DATA STORAGE DEVICE OF THE DRUM TYPE

Filed Dec. 2, 1958 4 Sheets-Sheet 3

Inventor
Darrell L. Mitchell by Sughrue and Rothwell Attys

Oct. 30, 1962 D. L. MITCHELL 3,061,822

MAGNETIC DATA STORAGE DEVICE OF THE DRUM TYPE

Filed Dec. 2, 1958 4 Sheets-Sheet 4

Inventor
Darrell L. Mitchell by Sughrue and Rothwell Attys

United States Patent Office 3,061,822

Patented Oct. 30, 1962

3,061,822

MAGNETIC DATA STORAGE DEVICE OF THE DRUM TYPE

Darrell L. Mitchell, Charleston, N.H., assignor, by mesne assignments, to Ex-Cell-O Corporation, Detroit, Mich., a corporation of Michigan Filed Dec. 2, 1958, Ser. No. 777,741

14 Claims. (Cl. 340—174.1)

This invention relates to a bearing structure and more particularly to an anti-friction bearing structure of the type adapted to support two ends of a rotatable shaft within a stationary housing such that the shaft may move axially with respect to the housing.

This invention has particular application when associated with rotatable magnetic data storage device having a record medium in the shape of a truncated right circular cone and a plurality of magnetic transducer heads associated therewith. With such devices it is a simple procedure to adjust the magnetic transducer heads relative to the conical drum by setting the heads in contact with the drum surface and then moving the drum axially to provide the desired air gap spacing. Such a procedure is disclosed in the copending application of Hugh M. Taft, Serial No. 684,278, assigned to the assignee of this invention, and reference may be had thereto for a more detailed description of the method for adjusting and setting the heads associated with a tapered drum. In the Taft application the conical drum is provided with air bearings for both rotatable and axial thrust support. However, it is often desirable to utilize anti-friction bearings such as ball bearings in a conical tapered drum of this nature. In the case where it is desired to use anti-friction bearings, difficulties are encountered as it is necessary to move the drum shaft axially for the desirable adjustments of the air gap between the transducer head and the periphery of the conical drum. It is therefore a principal object of this invention to provide an anti-friction bearing structure for a rotatable shaft which may be axially moved with respect to a stationary supporting housing. With such an arrangement, a tapered or conical drum carried by the shaft may be axially moved for adjusting the transducer heads associated therewith and may also be rotatably constrained to rotate in any desired adjusted axial position.

Although this invention has special application to a rotatable shaft carrying a frusto-conical drum such as used in a magnetic data storage device as described above, the invention is not limited thereto. The invention has applicability, for example, in any arrangement where it is desired to support a shaft by anti-friction bearings and adjustably position the shaft axially for rotation with respect to a stationary supporting housing.

Additional objects and advantages of this invention will be apparent from the following detailed description and claims taken in connection with the accompanying drawings which disclose, by way of examples, the principles of the invention and the best mode as well as several variations thereof which have been contemplated of applying these principles.

In general, this invention includes a rotatable member or shaft supporting a conical drum such as a magnetic data storage drum and the shaft is rotatably journaled by anti-friction bearings. The outer races of the anti-friction bearings are supported by movable cartridges and these cartridges are in turn movably supported from a stationary housing such that they may only allow the shaft carried thereby to move axially. Means may be provided for adjusting the movable cartridges to position the rotatable shaft and drum carried thereby in any desired position for operation. Means may also be provided for biasing the axially movable and rotatable shaft toward the direction of the larger end of the shaft such that the conical drum carried thereby would not normally come into contact with the surface of the adjacent stationary housing or the transducer heads mounted therein. Several modifications are illustrated in the accompanying drawings. In one modification the axially movable cartridges are journaled within the stationary housing by slidable ball bearings and a driving motor is positioned within the housing between the ball bearings. In another modification flexible diaphragms support the movable cartridges with the drive motor positioned between the bearings. In still another modification the flexible diaphragms support the movable cartridges for axial movement only while the motor housing is positioned outside the bearings for better thermal heat dissipation. An additional modification may be a modified combination of the aforementioned embodiments wherein a slidable bearing supports the cartridge but the driving motor is positioned outside the bearings, again for better heat dissipation.

Figure 1:
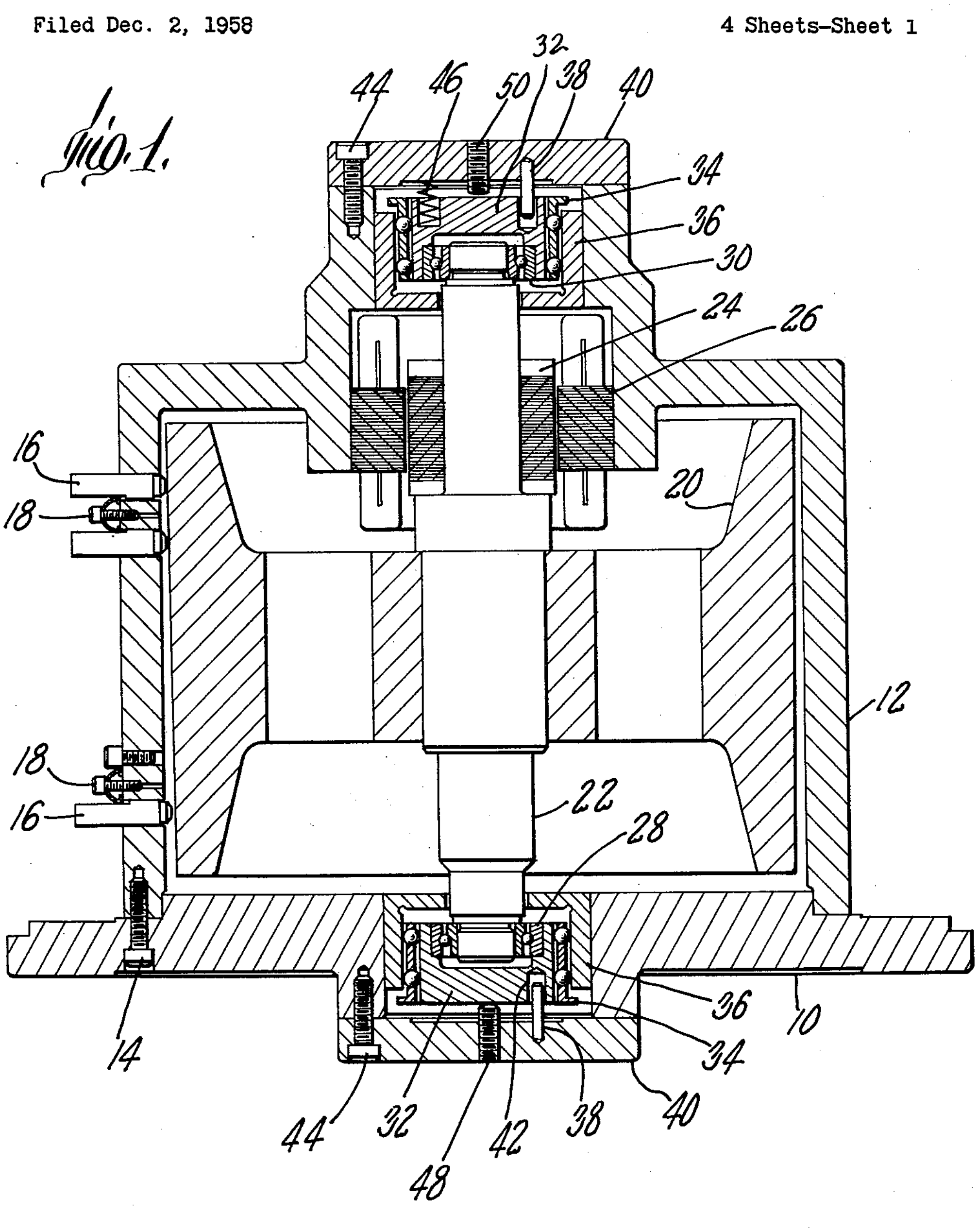
FIG. 1 is an elevation view, partially in section, illustrating one form of the invention as applied to a magnetic data storage device.

Referring to the drawings, FIG. 1 shows a suitable base 10 supporting a housing 12 which is secured thereto by screw means 14. The housing 12 may have a plurality of magnetic transducer heads 16 extending therethrough, and these transducer heads are adjustably secured by locking devices 18 as fully disclosed in the copending application of Taft, Serial No. 684,278.

The housing 12 is adapted to enclose a rotatable drum 20 which may have an outer surface in the shape of a truncated right circular cone allowing axial adjustment for the purpose of setting the magnetic transducer heads 16 with respect thereto as disclosed in the aforesaid Taft application. The drum 20 is rigidly secured to a supporting shaft 22, which shaft may also contain the rotor 24 of an electric motor. A stator 26 of the electric motor associated with the rotor 24 may be contained within the housing 12.

The shaft 22 is rotatably supported by ball bearings 28 and 30 at the lower and upper ends thereof, respectively. The outer races of the ball bearings are secured within axially movable cartridges 32—32. The outer periphery of the cartridges 32—32 is cylindrical and parallel to the supported cylindrical surface of the shaft 22. Anti-friction slide bearings 34—34 are positioned between the outer surfaces of the cartridges 32—32 and cylindrical housing inserts 36—36. The inner bearing surface of insert 36 is also parallel with the outer cylindrical surface of cartridge 32 and the supported cylindrical surface of shaft 22 such that when the balls of antifriction slide bearing 34 are moved there along the cartridge 32 will move parallel to the rotative axis of cylindrical shaft 22 thereby allowing the shaft to move axially. Means are provided to constrain the cartridges 32—32 from rotating. These means may be suitably guide pins 38—38 fixed in housing caps 40—40 and projecting into holes 42—42 of the cartridges 32—32. The housing caps 40—40 are secured to the housing 10 and the support 12 by suitable screws 44—44. Suitable means such as springs 46 may be provided under the upper housing cap 40 to bear against the upper cartridge 32 and thereby bias the entire rotatable assembly downward as viewed in FIG. 1. This will assure that the tapered conical surface of drum 20 is normally biased to its position of greatest clearance with respect to the cooperating housing 12 and associated transducer heads 16. An adjustable supporting screw 48 may be positioned in the bottom housing cap 40 and an adjustable clearance screw 50 may be positioned in the top housing cap 41. Screw 50 in normal condition has its innermost end spaced a minute distance from its corresponding cartridge 32. Screw 48 abuts the lower cartridge 32 and may be adjusted to axially position the drum for transducer head setting and for normal operation.

Figure 2:
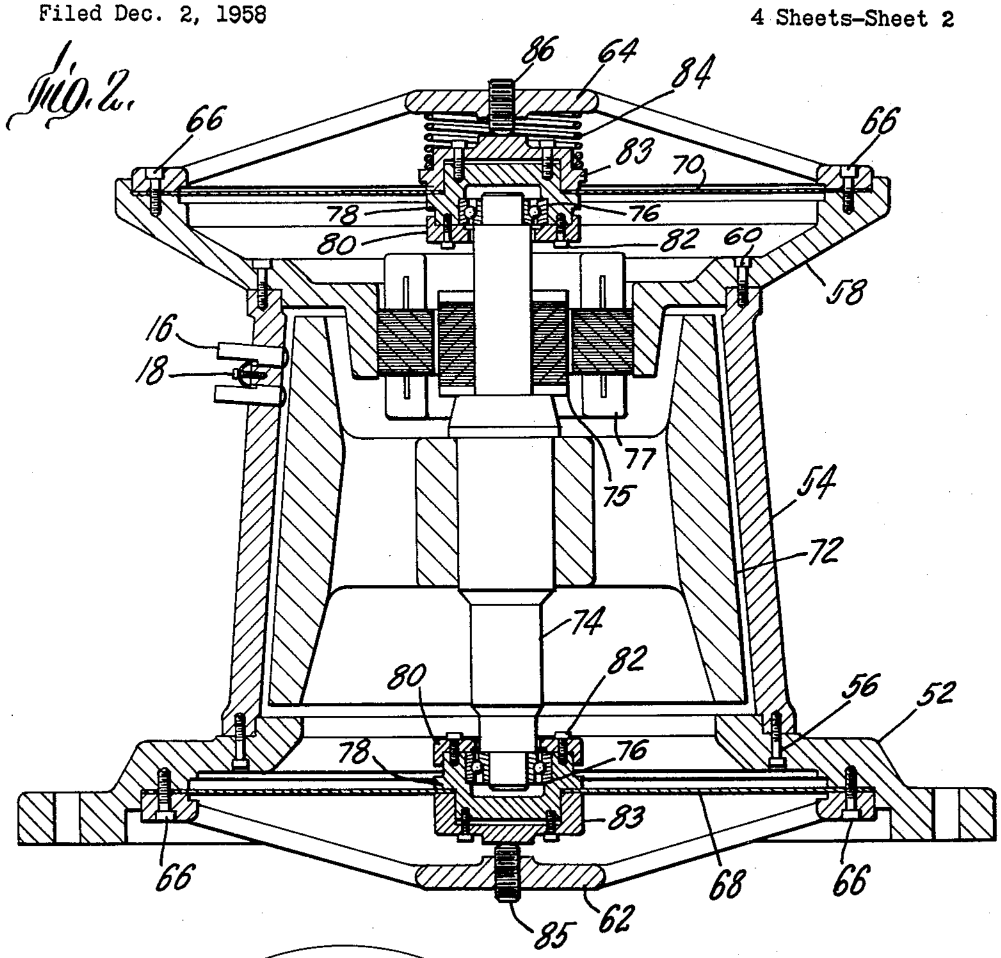
FIG. 2 is a sectional elevation view illustrating a modification of the bearing structure of this invention.
Figure 3:
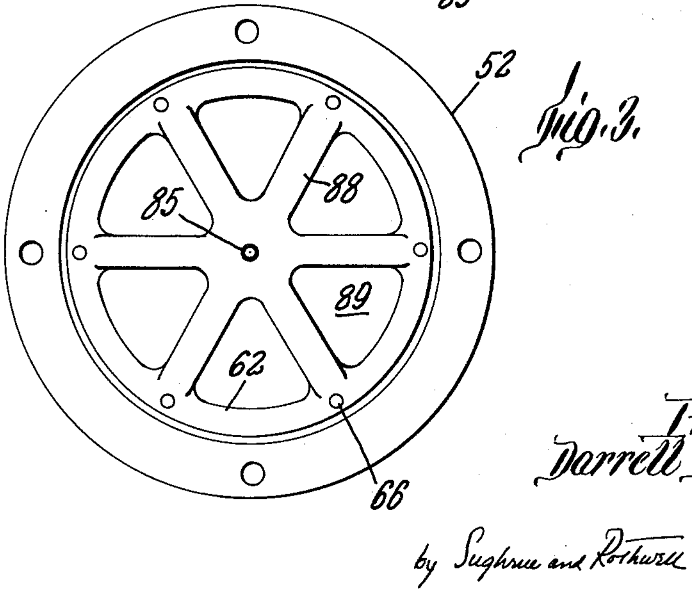
FIG. 3 is a plan view of the housing end bells shown in FIG. 2.

FIGS. 2 and 3 illustrates a modification of this invention, the principal features of this modification being the means for axially supporting the movable cartridge by a flexible diaphragm instead of by an anti-friction bearing and a ventilated housing structure for better heat dissipation from within the housing. As shown in FIG. 2, a base 52 supports a tapered housing side 54 which is secured thereto by screws 56. A top housing portion 58 is secured to the housing side 54 by screws 60. Housing end bells 62 and 64 are secured to the lower and upper housing portions 52 and 58, respectively, by suitable screw means 66. The housing end bells clamp lower and upper diaphragms 68 and 70, respectively, between the caps and the housings. A rotatable frusto-conical drum member 72 is housed within the housing and may have a magnetizable surface for cooperating with magnetic transducer heads 16 secured by locking devices 18. The drum 72 is rigidly secured to a rotatable shaft 74. Shaft 74 is journaled at each end by suitable anti-friction bearings 76—76. The outer races of bearings 76—76 are rigidly secured within cartridge members 78—78 having cartridge caps 80—80 attached thereto to rigidly hold the bearings 76—76 in place. Suitable screws 82 may be utilized to fasten the caps 80 to the cartridges 78. Diaphragm clamps 83—83 are utilized to clamp diaphragms 68—70 between their corresponding cartridges 78—78. A spring 84 may be utilized to bias the entire axially movable assembly toward the bottom as viewed in FIG. 2 and suitable adjusting screws 85, 86 are positioned in the bottom and top end bells 62 and 64, respectively. The entire rotative assembly may be driven by a suitable electric motor having a rotor 75 affixed to shaft 74 and this rotor cooperates in a known manner with a stator 77 secured to upper housing portion 58.

The end bells 62 and 64 may be constructed of a spoked design with spokes 88 as shown in FIG. 3, thereby leaving vacant spaces 89 between adjacent spokes. Vacant spaces 89 within the end bells permit air to circulate for the purposes of controlling the heat and therefore the thermal expansion thereof.

The lower screw 85 in normal operation abuts the lower clamp 83 to adjust the axial position of the drum 72 against the spring force of spring 84 acting to bias the rotatable assembly downwards. This spring force may be derived from the spring 84 or from the diaphragms 68—70 which may have a normal spring factor tending to bias the supported assembly in a downward direction as viewed in FIG. 2. The upper screw 86 in normal operation has its innermost end spaced slightly above the adjacent cap 83. Therefore, when the drum is static its axial position may be changed by adjusting screw 85, and the upper screw may be backed off a predetermined distance before the lower screw 85 is advanced to displace the assembly upward.

Figure 4:
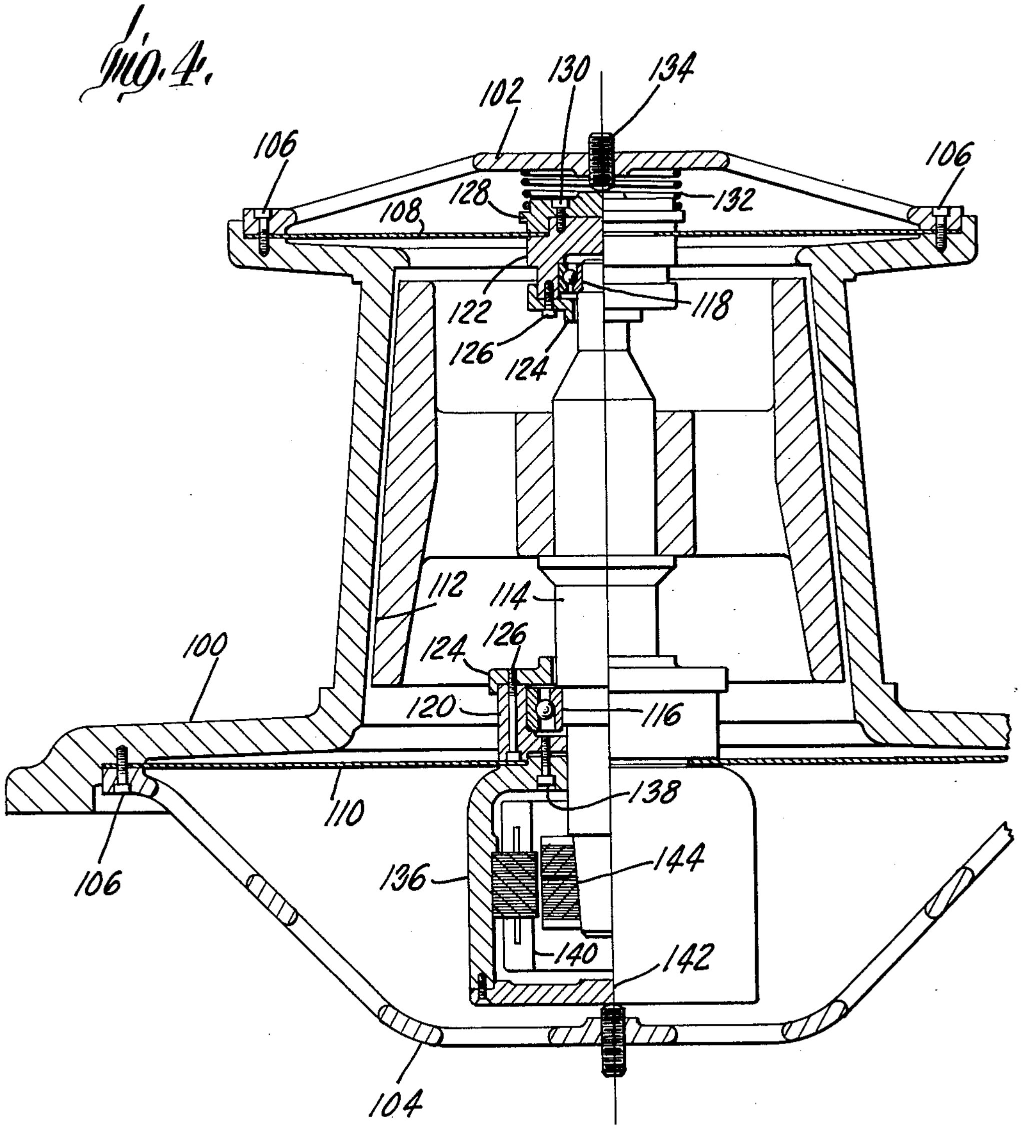
FIG. 4 is an elevation view, partially in section, illustrating another modification of this invention.

The embodiment of FIG. 4 similarly functions in a manner described for the two preceding embodiments. The principal difference is the location of the driving motor outside the bearings such that the stator housing for the motor forms the adjusting abutment for the lower movable cartridge. This location of the motor is favorable from the point of view of heat dissipation, and it is further advantageous from the standpoint of mounting or dismounting of the rotative assembly without disturbing the cartridges and ball bearings, thus making it possible to dynamically balance the rotative assembly in its own bearings. As shown in FIG. 4, a tapered sided housing 100 has upper and lower end bells 102 and 104 secured thereto by suitable screws 106. Diaphragms 110 are clamped between the end bells 102 and 104 and their corresponding housing flanges. A rotatable drum 112 having an outside surface in the shape of a truncated right circular cone is rigidly secured to a rotatable supporting shaft 114. Shaft 114 is in turn supported by suitable anti-friction bearings 116—118 at the lower and upper ends thereof. The outer races of the bearings are clamped within cartridges 120 and 122 and these cartridges may be provided with suitable bearing protectors 124 attached thereto by screws 126.

The upper cartridge 122 carries an abutment clamp 128 secured thereto by screws 130. A spring 132 may be provided between end bell 102 and abutment clamp 138 for biasing the rotative assembly downwards, and a suitable adjustable clearance screw 134 may be utilized for the same purposes as described in connection with FIGS. 1–3 embodiments.

The lower cartridge 120 supports a stator housing 136 from cap screws 138. A motor stator 140 is secured therein and the lower end of the housing is closed by an abutment cap 142. A motor rotor 144 is rigidly secured to the rotating shaft 114 at a position such that it will cooperate with the stator 140. The rotor 144 is sufficiently wide to allow the rotative assembly to be axially adjusted and the rotor will still be positioned adjacent the stator.

The FIG. 5 embodiment contains a combination of the features previously described in connection with the FIGS. 1 and 4 embodiments, i.e., a movable cartridge supported by anti-friction bearings for axial movement and a driving motor located outboards of the supporting bearings. The FIG. 5 construction has advantages where it is used in combination with comparatively long drums having a relatively small taper. This construction requires a rather long axial displacement for the head adjusting and setting procedure and a diaphragm capable of allowing this displacement by flexing this amount will have a prohibitively large diameter.

Figure 5:
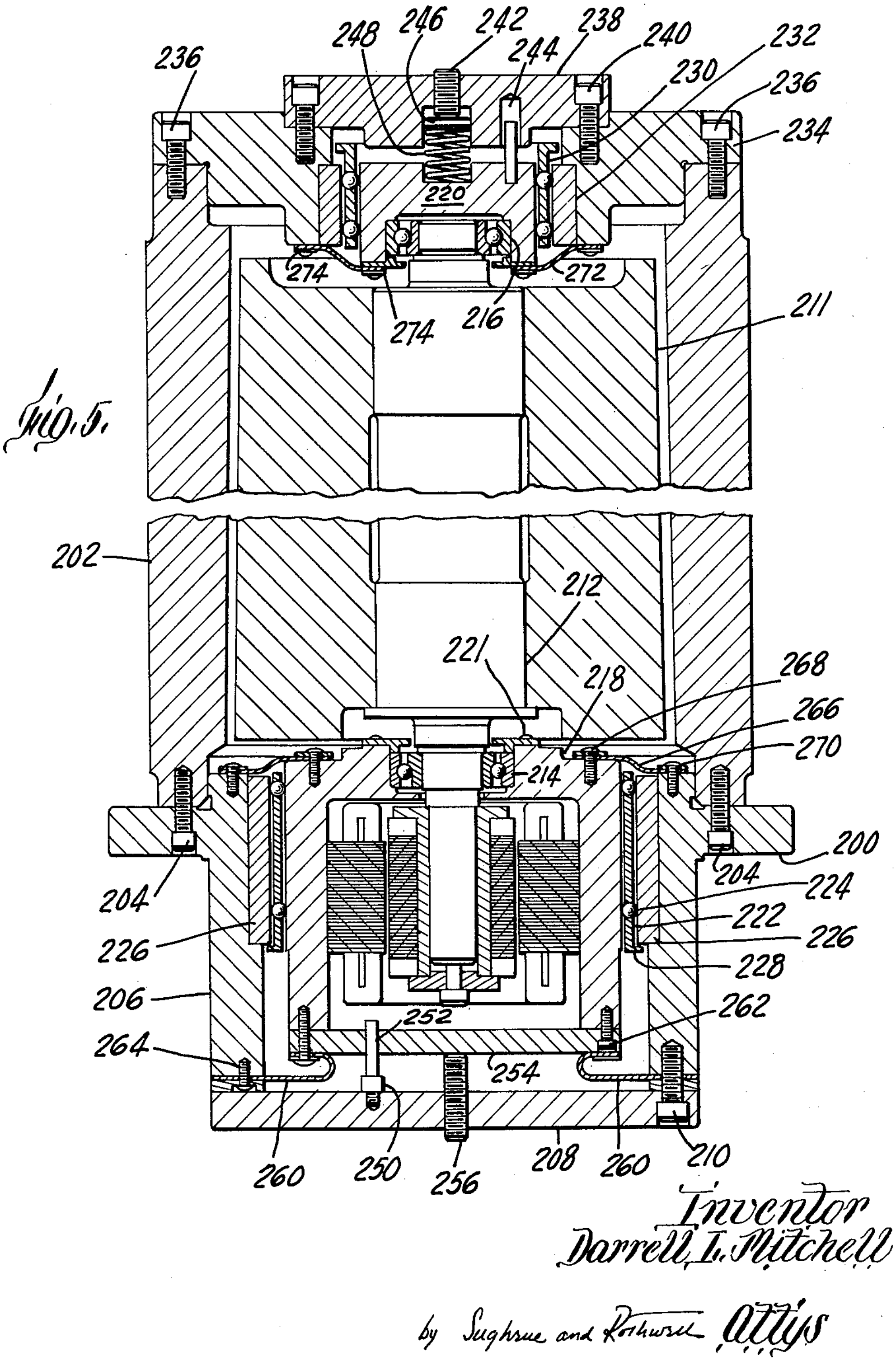
FIG. 5 is an elevation view, partially in section, illustrating still another variation of this invention in an additional modification.

Referring to FIG. 5, a supporting base 200 supports a tapered housing side 202 and this housing is secured thereto by screws 204. The base 200 has a depending portion 206 which is provided with a bottom end cap 208 attached thereto by screws 210. A tapered rotative drum 211 is secured to a support shaft 212 that is rotatably supported by anti-friction bearings 214 and 216 at its lower and upper ends respectively. The outer races of bearings 214 and 216 are secured within cartridges 218 and 220, respectively. A bearing protector 221 may be attached to cartridge 218 to keep foreign matter from entering therein. Lower cartridge 218 has an outer peripheral portion which is cylindrical and parallel to the supported cylindrical section of shaft 212. An anti-friction slide bearing 222 having suitable balls 224 abuts against the outer surface of cartridge 218 and guides cartridge for sliding movement relative to a housing insert 226. Upward movement of slide bearing 222 beyond a predetermined point is prevented by a flange 228 thereon. Upper cartridge 220 is similarly guided for axial movement only by an anti-friction bearing 230 which guides cartridge 220 for sliding movement within annular insert 232 in a top housing portion 234. Housing portion 234 is attached to housing side 202 by screw means 236.

A top cap 238 is secured to top housing portion 234 by screws 240 and this top cap contains a bias adjusting screw 242 and at least one guide pin 244. Guide pin 244 acts to constrain the cartridge 220 against rotation and adjusting screw 242 abuts against a disc 246 on the top of a biasing spring 248. Biasing spring 248 is for the purpose of biasing the entire rotative assembly downwards as viewed in FIG. 5. A similar guide pin 250 is provided for the lower cartridge 218 and this guide pin cooperates with a hole 252 in a cap 254 secured to the bottom of cartridge 218. An adjusting screw 256 threaded in the bottom cap 208 abuts cap 254 to adjust the axial position of the rotative assembly similar to that in the previously described embodiments.

A diaphragm 260 is secured to cap 254 by screws 262 and is secured to the housing portion 206 by screws 264. This diaphragm 260 and diaphragm 266 which is secured to the top of cartridge 218 by screws 268 and to the top of housing 208 by screws 270 cooperate to retain lubricant within the rotative assembly and protect the drum proper 210 from being contaminated. In a similar manner a diaphragm 272 secured to the bottom of cap 234 and to the bottom of cartridge 220 by rivets 274 likewise retains the lubricant in the upper bearing assembly and provides sealing function similar to the diaphragms previously described.

The operation of the above-described embodiments is believed to be evident from the detailed structural description. However, a summary of the operation in the environment of a tapered drum magnetic data storage device will now be described. The magnetic transducer heads 16 may be loosely positioned within holes in the supporting housings and the tapered drums may be moved axially a sufficient distance until they abut the ends of each transducer 16. Then the locking and setting devices 18 may be actuated as described in the aforementioned Taft application to lock the transducer heads 16 in contact with the surface of the associated tapered drum. Then the supporting screw for the bottom axially movable cartridge may be backed off to allow the drum to move downwardly and provide the desired clearance space. This movement is possible because the supports for the axially movable cartridge allow the cartridge to move axially. The upper screw may be advanced to contact the upper cartridge and then backed off slightly to establish a predetermined running position wherein the entire rotative assembly is constrained to rotate by the supporting cartridges and the lower cartridge is supported by the lower adjusting screw. Thus, all of the transducer heads may be easily and effectively adjusted by a simple axial adjustment of the tapered drum and a novel movable bearing arrangement allows the drum to be axially moved.

While there has been illustrated and described the fundamental novel features of the invention as applied to the various embodiments, it will be understood that other omissions and substitutions and changes in the form and details of the device illustrated and in its operation may be made by those skilled in the art without departing from the spirit of the invention. It is the intention, therefore, to be limited only as indicated by the scope of the appended claims and reasonable equivalents thereof.

What is claimed is:

1. A magnetic data storage device comprising in combination: a stationary housing; at least one magnetic transducer head fastened through said housing with its pole piece protruding therein; a rotatable member with a body portion in the shape of a truncated right circular cone, the surface of the body portion having a magnetizable record surface thereon; a shaft rigidly supporting said rotatable member for rotation around its axis; anti-friction bearings secured to said shaft at both ends thereof and rotatably supporting said shaft; a cup-shaped cartridge member fastened to the outer race of each one of said anti-friction bearings; an anti-friction slide bearing disposed around said cartridge member substantially concentrically therewith; two cylindrical housing inserts fixedly fastened to the housing at both ends thereof substantially concentrically and adapted to slidably receive said slide bearings; means preventing the cartridge members from rotating; and means adjusting said cartridge members axially whereby said shaft and rotatable member are caused to be displaced axially relatively to the housing for establishing a predetermined air gap between the transducer head pole piece and said magnetizable surface on the body of said rotatable member before and during operation of the device.

2. A device as claimed in claim 1 further comprising means biasing the rotatable member toward the end of the rotatable member having the largest diameter.

3. A device as claimed in claim 1 further comprising means biasing the rotatable member toward the end of the rotatable member having the smallest diameter.

4. A device as claimed in claim 1, in which the anti-friction bearings are ball bearings and the anti-friction slide bearing is a slide ball bearing.

5. A device as claimed in claim 1, in which the means adjusting axially the cup-shaped cartridge members comprises a threaded member in each end cap of said stationary housing, said threaded member having one end abutting against the bottom of said cartridge member for axial displacement thereof when said threaded member is manually rotated.

6. In combination with a magnetic data storage device of the type having a tapered drum and a plurality of transducer head associated therewith, an improved bearing structure rotatably supporting said drum and also allowing said drum to be movable axially, said bearing structure comprising: a shaft supporting said tapered drum; a housing assembly supporting said transducer heads; anti-friction bearings secured to said shaft at each end of said drum; a cartridge supporting the outer race ring of each of the anti-friction bearings; separate means connecting each cartridge to the said housing assembly for allowing said cartridge to be movable only parallel to the axis of said shaft for adjusting the clearance between the surface of said tapered drum and the tips of said transducer heads.

7. A device as claimed in claim 6 further comprising means biasing the shaft toward the end of the tapered drum having the largest diameter.

8. A device as claimed in claim 6 further comprising means biasing the shaft toward the end of the tapered drum having the smallest diameter.

9. A magnetic data storage device comprising: a rotatable member having a circular transverse section which decreases in diameter from one end to the other end thereof; a magnetizable surface layer on the perimeter side surface of said rotatable member; a housing structure adapted to surround said rotatable member; a plurality of magnetic transducer heads mounted on said housing structure with their tips at a predetermined distance from said magnetizable surface; a shaft supporting said rotatable member; driving means for said shaft; bearing means supporting said shaft for rotation within said housing structure and means adjusting said bearing means axially for limited axial linear movement of said rotatable member relative to said housing structure in order to establish said predetermined distance between the transducer tips and the magnetizable surface on said rotatable member.

10. A device as claimed in claim 9 further comprising means biasing the rotatable member toward the end of the rotatable member having the greatest diameter.

11. A device as claimed in claim 9 further comprising means biasing the rotatable member toward the end of the rotatable member having the smallest diameter.

12. A device as claimed in claim 9 wherein the bearing means supporting the shaft for rotation within the housing structure comprises: a ball bearing on each end of said shaft; a cartridge member surrounding the outer race ring of said ball bearing and being fixedly fastened thereon; and a disc shaped flexible diaphragm member fastened peripherally to said housing and having a central aperture for clamping therein of said cartridge to prevent rotation of said cartridge whilst allowing longitudinal motion of said cartridge under the action of said means adjusting the bearing means axially.

13. A device as claimed in claim 9 wherein the bearing means supporting the shaft for rotation within the housing structure comprises: a ball bearing on each end of said shaft; a substantially cylindrical cartridge member surrounding the outer race ring of said ball bearing and being fixedly fastened thereon; a substantially cylindrical slide ball bearing interposed between said cartridge and the housing structure for sliding movement of said cartridge along the axis of said shaft: and means keying said cartridge to said housing to prevent rotation of said cartridge whilst allowing longitudinal motion of said cartridge.

14. In a magnetic data storage device comprising a stationary housing, a plurality of magnetic transducer heads fastened through said housing with their pole pieces protruding therein and a rotatable member with a magnetizable surface record body in the shape of a truncated right circular cone supported by bearing means for rotation within said housing, the method of presetting the air gap clearance between said pole-pieces and said magnetizable surface comprising the steps: displacing the rotatable member axially in the direction of the smallest diameter; setting all the transducer heads with their pole pieces in contact with the surface of the magnetizable record body; displacing the rotatable member axially in the direction of its largest diameter until a pretermined air gap has been established between the pole pieces and the magnetizable surface.

References Cited in the file of this patent

UNITED STATES PATENTS

| | | |
|---|---|---|
| 2,221,176 | Boll | Nov. 12, 1940 |
| 2,272,986 | Veinkauff | Feb. 10, 1942 |
| 2,674,140 | Eger | Apr. 6, 1954 |
| 2,794,180 | Berger et al. | May 28, 1957 |
| 2,915,358 | Richards | Dec. 1, 1959 |